US008195165B2

(12) United States Patent
Han et al.

(10) Patent No.: US 8,195,165 B2
(45) Date of Patent: Jun. 5, 2012

(54) APPARATUS AND METHOD FOR HANDOVER IN MOBILE COMMUNICATION SYSTEM

(75) Inventors: Jung-Hee Han, Seoul (KR); Hwa-Jin Cha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 12/657,049

(22) Filed: Jan. 12, 2010

(65) Prior Publication Data

US 2010/0178922 A1      Jul. 15, 2010

(30) Foreign Application Priority Data

Jan. 13, 2009   (KR) .................. 10-2009-0002524

(51) Int. Cl.
*H04W 36/00*          (2009.01)
*H04W 4/00*           (2009.01)

(52) U.S. Cl. ........................................ 455/436; 370/331

(58) Field of Classification Search .................. 455/436, 455/435.1, 422.1, 435.2, 438, 439, 442, 552.1, 455/437; 370/331–334, 329
See application file for complete search history.

(56) References Cited

U.S. PATENT DOCUMENTS

| | | | | |
|---|---|---|---|---|
| 2004/0038681 | A1* | 2/2004 | Chun .............................. | 455/436 |
| 2004/0053614 | A1* | 3/2004 | Il-Gyu et al. .................. | 455/436 |
| 2004/0179666 | A1* | 9/2004 | Milton ...................... | 379/201.02 |
| 2005/0013421 | A1* | 1/2005 | Chavez et al. ............. | 379/93.09 |
| 2005/0036462 | A1  | 2/2005 | Sillasto et al. | |
| 2005/0201337 | A1* | 9/2005 | Heo et al. ...................... | 370/335 |
| 2005/0213575 | A1* | 9/2005 | Shin et al. ...................... | 370/389 |
| 2005/0255847 | A1* | 11/2005 | Han et al. ...................... | 455/436 |
| 2006/0166677 | A1* | 7/2006 | Derakshan et al. ........... | 455/453 |
| 2006/0172739 | A1* | 8/2006 | Wigard et al. ................ | 455/442 |
| 2007/0021151 | A1* | 1/2007 | Mori et al. ................. | 455/562.1 |
| 2007/0129075 | A1* | 6/2007 | Kim et al. ...................... | 455/436 |
| 2007/0258410 | A1* | 11/2007 | Huang et al. .................. | 370/331 |
| 2008/0020770 | A1* | 1/2008 | Hofmann ...................... | 455/438 |
| 2008/0026726 | A1* | 1/2008 | Tariq et al. .................... | 455/411 |
| 2008/0043672 | A1* | 2/2008 | Sebire et al. .................. | 370/331 |
| 2008/0089325 | A1* | 4/2008 | Sung .............................. | 370/389 |
| 2009/0129342 | A1* | 5/2009 | Hwang et al. ................. | 370/331 |
| 2011/0013586 | A1* | 1/2011 | Oh et al. ....................... | 370/331 |

FOREIGN PATENT DOCUMENTS

| | | |
|---|---|---|
| KR | 10-2000-0009979 A | 2/2000 |
| KR | 10-2001-0017860 A | 3/2001 |

OTHER PUBLICATIONS

International Search Report dated Sep. 15, 2010 in connection with International Patent Application No. PCT/KR2010/000213.
Written Opinion of the International Searching Authority dated Sep. 15, 2010 in connection with International Patent Application No. PCT/KR2010/000213.

* cited by examiner

*Primary Examiner* — Melody Mehrpour

(57) ABSTRACT

An apparatus and method for handover in a mobile communication system enables a Mobile Station (MS) to perform a normal handover without performing an unnecessary handover. A Base Station (BS) apparatus capable of preventing an unnecessary handover includes a handover manager. The handover manager receives handover information, including information about at least one cell through which an MS has passed, from a neighbor cell to determine whether the MS has performed an unnecessary handover. If it is determined that the MS has performed an unnecessary handover, the handover manager notifies the occurrence of the unnecessary handover by the MS to the neighbor cell.

20 Claims, 5 Drawing Sheets

APPARATUS AND METHOD FOR HANDOVER IN MOBILE COMMUNICATION SYSTEM

CROSS-REFERENCE TO RELATED APPLICATION(S) AND CLAIM OF PRIORITY

The present application is related to and claims priority under 35 U.S.C. §119 of a Korean patent application filed in the Korean Intellectual Property Office on Jan. 13, 2009 and assigned Serial No. 10-2009-0002524, the entire disclosure of which is hereby incorporated by reference.

TECHNICAL FIELD OF THE INVENTION

The present invention relates generally to an apparatus and method for handover in a mobile communication system. More particularly, the present invention relates to a base station (BS) for using, if a Mobile Station (MS) performs handover to a plurality of cells within a predetermined time and it is determined that the MS has performed unnecessary handover to at least one of the handover cells, the history information to perform normal handover without performing the unnecessary handover.

BACKGROUND OF THE INVENTION

A mobile communication system performs handover so that a Mobile Station (MS) secures mobility to perform communication. The handover is to change Base Stations (BSs) while maintaining the call connection of an MS in a mobile communication system, which is unnoticed by a user of the MS. Accordingly, the MS continues to maintain call connection by performing control according to the BS change.

Extensive research has been conducted on the handover technology for the conventional 2G/3G systems. In particular, research has been conducted to prevent unnecessary frequent handover, such as a ping-pong phenomenon, in an overlapping region between two cells.

In order to overcome the above limitation, the 3GPP Rel8 (LTE) system includes UE-History information, indicating the stay time of a UE in each cell, in a field of a handover preparation information message and optimizes handover on the basis of the specific information of the UE.

However, the above method has a limitation in handover optimization because it does not use information in a neighbor cell (particularly, a handover target cell).

FIG. 1 illustrates a diagram of a handover process in a general mobile communication system.

Referring to FIG. 1, it is assumed that a Mobile Station (MS) 100 moves across an overlapping region between cells A 110, B 120 and C 130. That is, the MS 100 performs a handover from the cell B 120 to the cell C 130 immediately after performing a handover from the cell A 110 to the cell B 120. In this case, the cell A 110 cannot detect the occurrence of such an unnecessary handover (i.e., a handover to the cell B 120) for itself.

The cell C 130 can detect the occurrence of an unnecessary handover by means of the history information of the MS 100 but cannot perform handover optimization only by means of the information exchanged between cells, which is defined in the 3GPP standard specification.

That is, if moving from a point of the cell A 110 to the cell C 130 as illustrated in FIG. 1, the MS 100 performs a handover to the cell B 120 and then a handover from the cell B 120 to the cell C 130, at points A 102, B 104 and C 106 in the overlapping region between the cells A 110, B 120 and C 130. That is, the MS 100 performs a handover to the cell C 130 after performing an unnecessary handover to the cell B 120, thus degrading the performance of the mobile communication system.

What is therefore required an apparatus and method for preventing the performance degradation of the mobile communication system that may be caused by an unnecessary handover to the cell B 120, which may occur when the MS 100 moves from the cell A 110 to the cell C 130 as illustrated in FIG. 1.

SUMMARY OF THE INVENTION

To address the above-discussed deficiencies of the prior art, it is a primary aspect of the present invention to solve at least the above problems and/or disadvantages and to provide at least the advantages below. Accordingly, an object of the present invention is to provide an apparatus and method for preventing, in the event of handover to a plurality of cells in a mobile communication system, an unnecessary handover to at least one of the handover cells.

Another aspect of the present invention is to provide an apparatus and method for determining the occurrence of an unnecessary handover in a mobile communication system by means of information of cells through which an MS has moved.

Another aspect of the present invention is to provide an apparatus and method for notifying, in the event of detecting the occurrence of an unnecessary handover of an MS in a mobile communication system, the occurrence of the unnecessary handover to related cells to prevent the MS from performing an unnecessary handover again afterward.

Yet another aspect of the present invention is to provide an apparatus and method for correcting, in the event of receiving information indicating the occurrence of an unnecessary handover of an MS in a mobile communication system, the handover parameters to prevent the MS from performing an unnecessary handover again afterward.

In accordance with an aspect of the present invention, a BS apparatus capable of preventing an unnecessary handover includes: a handover manager that receives handover information, including information about at least one cell through which an MS has passed, from a neighbor cell to determine whether the MS has performed an unnecessary handover, and notifies the occurrence of an unnecessary handover by the MS to the neighbor cell if determining that the MS has performed an unnecessary handover.

In accordance with another aspect of the present invention, a method for a BS to prevent an unnecessary handover includes: receiving handover information, including information about at least one cell through which an MS has passed, from a neighbor cell to determine whether the MS has performed an unnecessary handover; and notifying the occurrence of an unnecessary handover by the MS to the neighbor cell if determining that the MS has performed an unnecessary handover.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure.

The present invention provides an apparatus and method for determining, when a handover to a plurality of cell is performed in a mobile communication system, the occurrence of an unnecessary handover by means of information of cells through which a Mobile Station (MS) has passed in order to prevent an unnecessary handover to at least one of the handover cells.

In the following description, handover information includes information about cells through which an MS has passed, the stay time of the MS in each of the cells and the characteristics, such as position and speed, of the MS.

Figure 1:
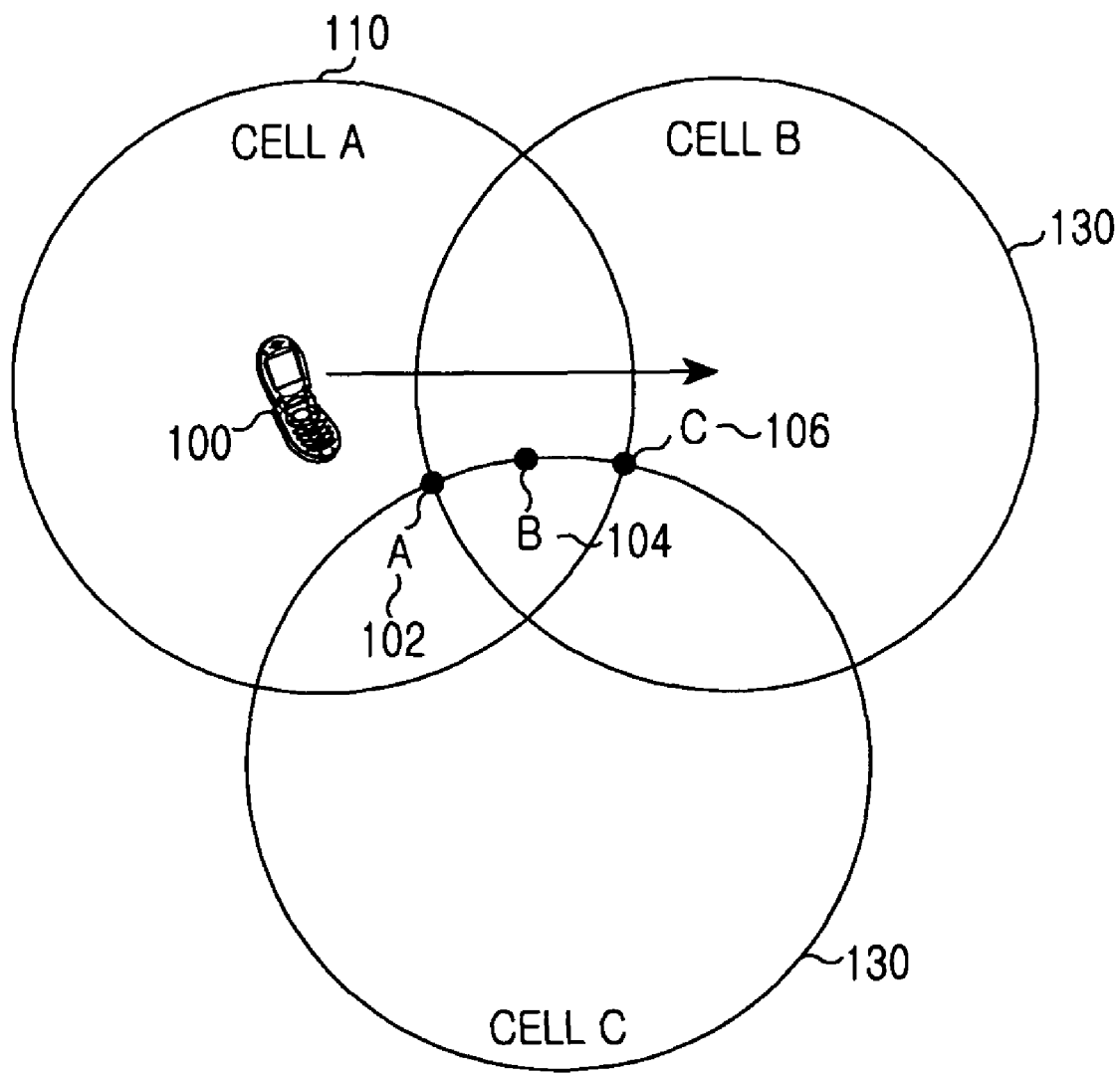
FIG. 1 illustrates a diagram of a handover process in a general mobile communication system.
Figure 2:
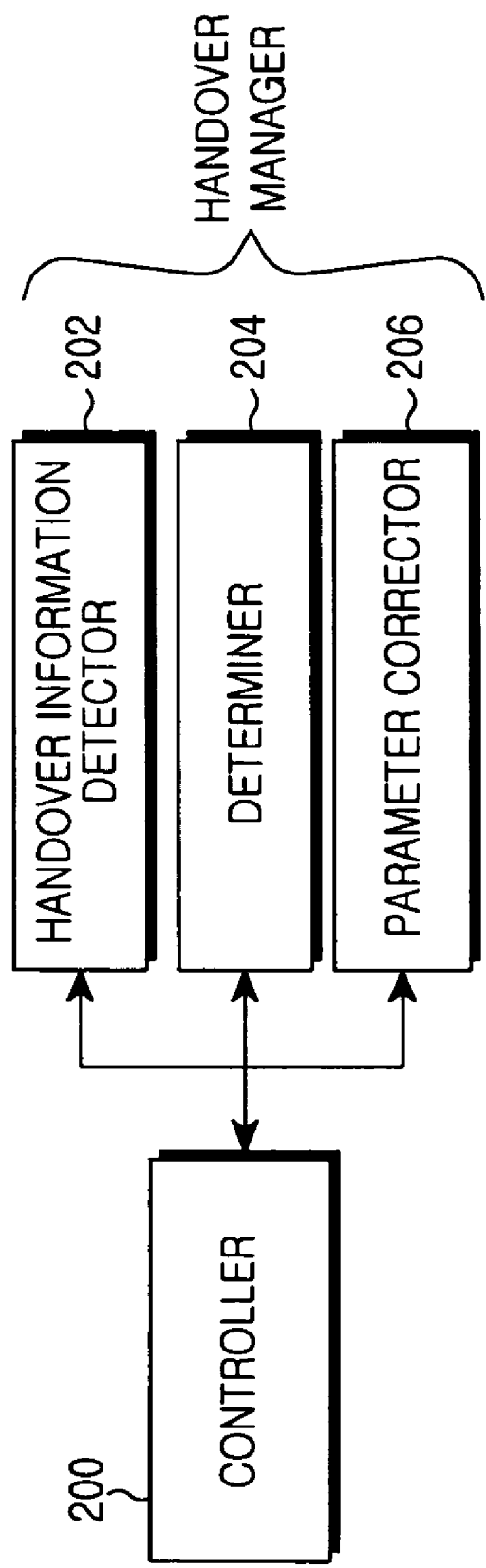
FIG. 2 illustrates a block diagram of a Base Station (BS) for preventing the occurrence of an unnecessary handover according to an exemplary embodiment of the present invention.

FIG. 2 illustrates a block diagram of a Base Station (BS) for preventing the occurrence of an unnecessary handover according to an exemplary embodiment of the present invention.

FIG. 2, the BS includes a controller 200, a handover information detector 202, a determiner 204, and a parameter corrector 206. Herein, the handover detector 202, the determiner 204 and the parameter corrector 206 are defined as a handover manager.

The controller 200 performs an overall operation of the BS. According to the present invention, if detecting that an MS is to perform a handover to a target cell, the controller 200 transmits handover information including handover history information of the MS to the target cell. At this point, the controller 200 transmits the handover information of the MS to the target cell together with handover information received from a neighbor cell. Herein, the handover information received from the neighbor cell means handover information of the previous handover cell of the MS. If the BS is a target BS that has received handover information from a serving BS, the controller 200 detects information about at least one cell, through which the MS has passed, by means of the received handover information and detects whether the MS has performed a handover to a plurality of cells within a predetermined time, thereby determining whether the MS has performed an unnecessary handover.

If it is determined that the MS has performed an unnecessary handover, the controller 200 transmits the determination to a BS (i.e., a serving BS) corresponding to the cell through which the MS has passed.

If receiving, from a neighbor cell (a target BS), information indicating that the MS has performed an unnecessary handover, the controller 200 corrects the handover parameters of a target cell to reduce the cell coverage, thereby preventing the MS from performing an unnecessary handover again afterward.

The controller 200 controls the handover manager to perform the above operation.

The handover information detector 202 of the handover manager detects the handover information received from the neighbor cell, and the determiner 204 uses the detected handover information of the handover information detector 202 to determine whether the MS has performed an unnecessary handover. If detecting that the MS has performed an unnecessary handover, the parameter corrector 206 of the handover manager corrects the handover parameters of a target cell so that the MS performs a normal handover directly without performing an unnecessary handover. Although it has been illustrated in FIG. 2 that the handover information detector 202, the determiner 204 and the parameter corrector 206 of the handover manager are provided outside the controller 200, the present invention is not limited thereto. In this regard, those skilled in the art will understand that various changes in configurations may be made therein without departing from the scope of the invention. For example, the controller 200 may be configured to perform all of the operations of the handover information detector 202, the determiner 204 and the parameter corrector 206.

In the above, a description has been made of an apparatus for determining, when a handover to a plurality of cell is performed in a mobile communication system, the occurrence of an unnecessary handover by means of information of cells, through which an MS has passed, in order to prevent an unnecessary handover to at least one of the handover cells. Hereinafter, a description will be given of a method for preventing, when a handover to a plurality of cells is performed in a mobile communication system, an unnecessary handover to at least one of the handover cells by means of the above apparatus.

Figure 3:
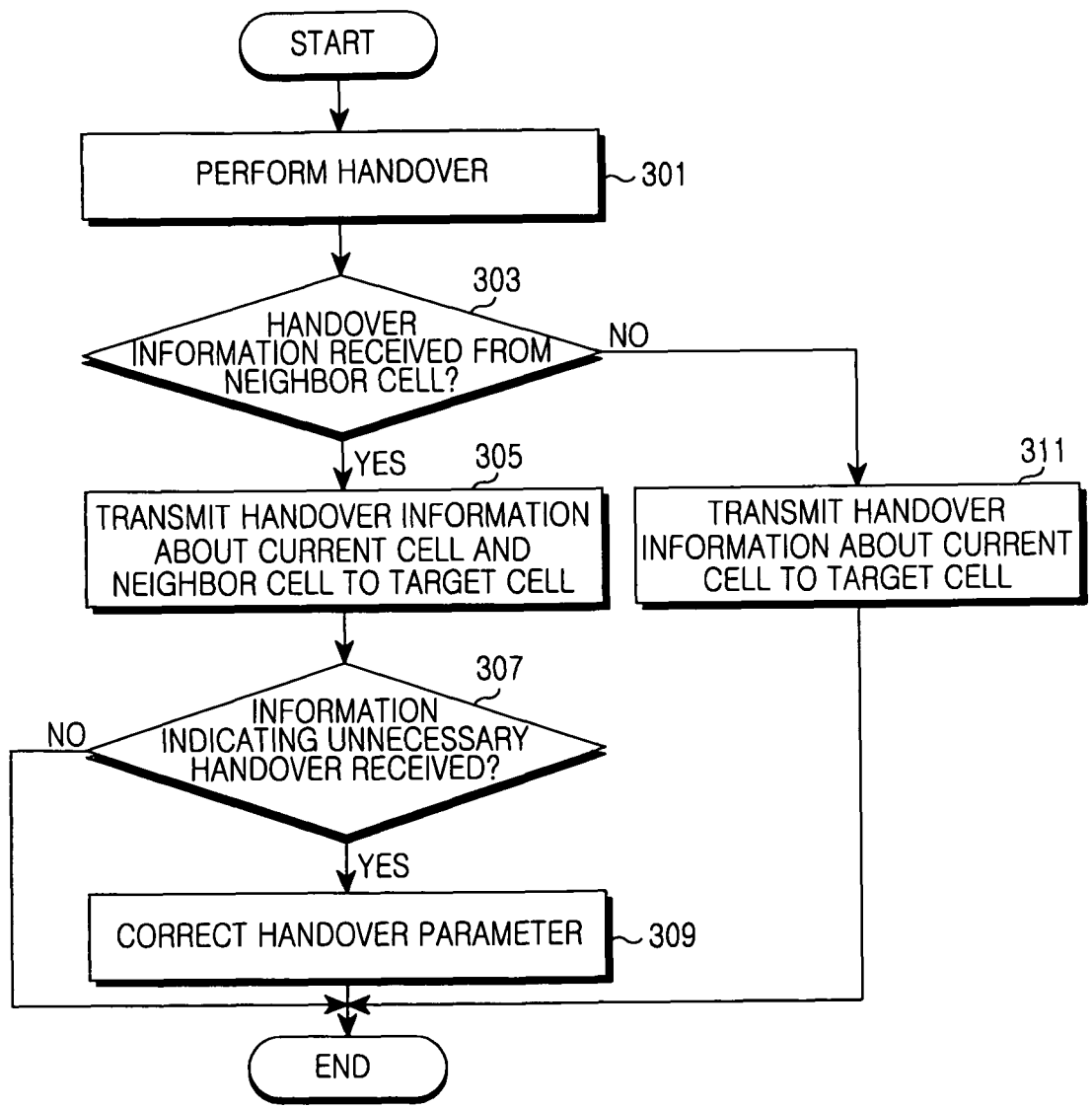
FIG. 3 illustrates a flowchart of a process for a BS to prevent the occurrence of an unnecessary handover according to an exemplary embodiment of the present invention.

FIG. 3 illustrates a flowchart of a process for a BS to prevent the occurrence of an unnecessary handover according to an exemplary embodiment of the present invention.

FIG. 3, the BS performs a handover process in step 301. That is, the BS receives a handover request from an MS, which is to perform a handover from a serving cell, and performs a handover process with the MS accordingly.

Thereafter, in step 303, the BS determines whether handover information is received from a neighbor cell.

If handover information is not received from the neighbor cell (in step 303), the BS proceeds to step 311. In step 311, the BS transmits handover information about the current cell to a target cell.

If handover information is received from the neighbor cell (in step 303), the BS proceeds to step 305. In step 305, the BS transmits handover information about the neighbor cell and the current cell to the target cell.

That is, the BS transmits handover information about the current cell, received from the MS, and handover information about the neighbor cell through which the MS has passed, to the target cell to which the MS is to be handed over.

Thereafter, in step 307, the BS determines whether information indicating the occurrence of an unnecessary handover by the MS is received from a target BS. Herein, the unnecessary handover means that the MS performs a handover to a plurality of cell within a short time while moving through an overlapping cell coverage region. For example, if the MS is located in an overlapping region between cells A, B and C and moves from the cell A to the cell C, the MS performs a handover from the cell A to the cell B and then a handover from the cell B to the cell C. In this case, the BS may determine that the MS has performed an unnecessary handover from the cell A to the cell B.

If information indicating the occurrence of an unnecessary handover by the MS is not received from the target BS (in step 307), the BS ends the process of the present invention.

If information indicating the occurrence of an unnecessary handover by the MS is received from the target BS (in step 307), the BS proceeds to step 309. In step 309, the BS corrects handover parameters to prevent the unnecessary handover process from being performed again.

That is, the BS corrects handover parameters to make the cell C become the best candidate cell, to reduce the coverage of the cell that has performed an unnecessary handover, so that the MS can perform a handover from the cell A to the cell C directly without performing a handover to the cell B when moving from the cell A to the cell C.

Thereafter, the BS ends the process of the present invention.

Figure 4:
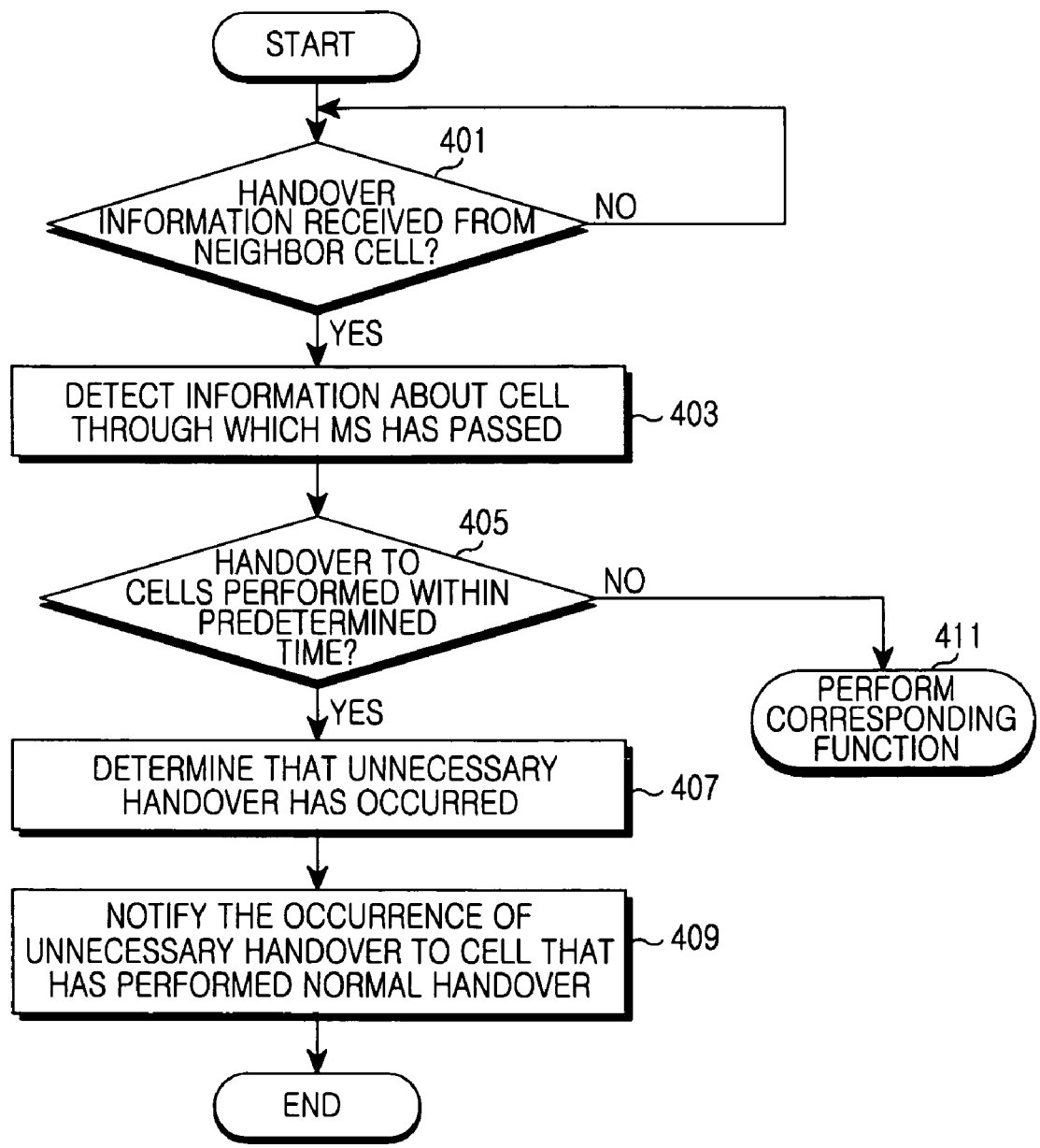
FIG. 4 illustrates a flowchart of a process for a BS to determine the occurrence of an unnecessary handover according to an exemplary embodiment of the present invention.

FIG. 4 illustrates a flowchart of a process for a BS to determine the occurrence of an unnecessary handover according to an exemplary embodiment of the present invention.

FIG. 4, in step 401, the BS determines whether handover information is received from a neighbor cell. Herein, the neighbor cell (BS) means one or more cells where an MS is located before a handover to the current cell. The handover information includes history information of the MS (e.g., handover history and cell selection/reselection history), which may be received together with a handover request. If handover information is not received from the neighbor cell (in step 401), the BS performs step 401 again. If handover information is received from the neighbor cell (in step 401), the BS proceeds to step 403. In step 403, the BS uses the received handover information to detect information about at least one cell through which the MS has passed. Thereafter, in step 405, the BS determines whether the MS has performed a handover to a plurality of cells within a predetermined time. This is to determine whether the MS has performed an unnecessary handover.

If the MS has not performed a handover to a plurality of cells within a predetermined time (in step 405), the BS proceeds to step 411. In step 411, the BS performs a corresponding function (e.g., a handover process).

If the MS has performed a handover to a plurality of cells within a predetermined time (in step 405), the BS proceeds to step 407. In step 407, the BS determines whether the MS has performed an unnecessary handover. Herein, if determining that the MS has performed a handover to a plurality of cells within a predetermined time, the BS may determine that the MS has performed an unnecessary handover to at least one of the handover cells. At this point, the BS has to determine the unnecessary handover and the MS that performs a normal handover to a plurality of cells within a short time by rapid movement. In this context, the BS determines the unnecessary handover by determining whether there are measurements for Event A3 (Neighbor becomes amount of offset better than serving), Event A4 (Neighbor becomes better than absolute threshold) and Event A5 (Serving becomes worse than absolute threshold1 AND Neighbor becomes better than another absolute threshold2) in the previous cell with respect to the current cell.

Thereafter, in step 409, the BS transmits information, indicating the occurrence of an unnecessary handover, to the cell that has performed a normal handover. For example, if the MS is located in an overlapping region between cells A, B and C and moves from the cell A to the cell C, the MS performs a handover from the cell A to the cell B and then a handover from the cell B to the cell C. In this case, the BS determines that the MS has performed an unnecessary handover from the cell A to the cell B, and transmits the information, indicating the occurrence of an unnecessary handover, to the cell A, i.e., the cell that has performed a normal handover.

Thereafter, the BS ends the process of the present invention.

Figure 5:
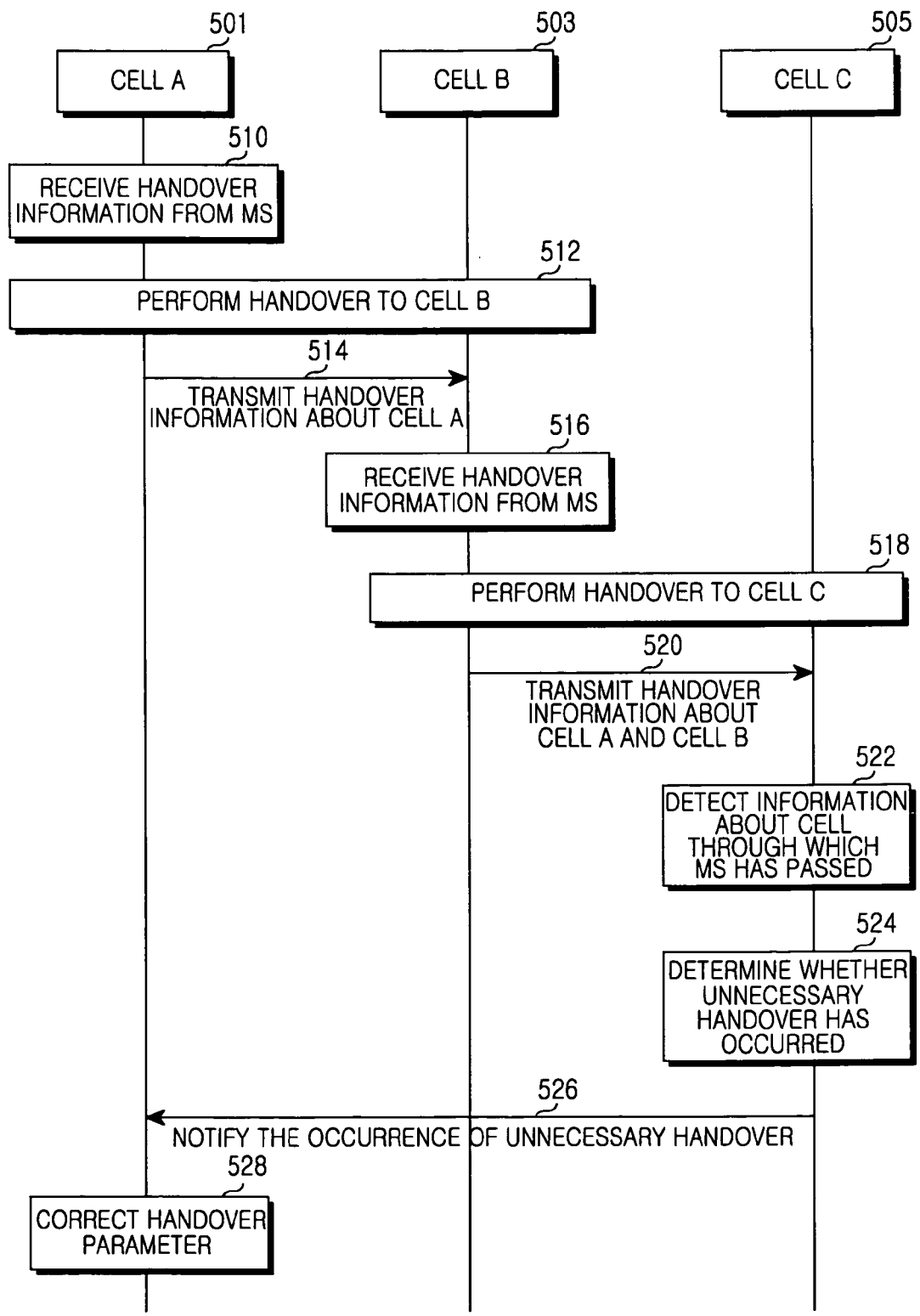
FIG. 5 illustrates a sequence diagram illustrating a process for a mobile communication system to prevent the occurrence of an unnecessary handover according to an exemplary embodiment of the present invention.

FIG. 5 illustrates a sequence diagram of a process for a mobile communication system to prevent the occurrence of an unnecessary handover according to an exemplary embodiment of the present invention.

FIG. 5, the mobile communication system includes a BS 501 corresponding to a cell A, a BS 503 corresponding to a cell B, and a BS 505 corresponding to a cell C.

If an MS is to perform a handover to the BS 501, the BS 501 receives handover information from the MS (in step 510). Herein, the handover information includes history information of the MS (e.g., handover history and cell selection/reselection history). If the MS performs a handover to the BS 503 (in step 512) after performing a handover to the BS 501, the BS 501 transmits the handover information, received from the MS, to the BS 503 (in step 514). Thereafter, the BS 503 receives handover information from the MS (in step 516).

If the MS performs a handover to the BS 505 corresponding to the cell C (in step 518), the BS 503 transmits handover information corresponding to the cell A and B to the BS 505 (in step 520). Accordingly, the BS 505 may use the handover information corresponding to the cells A and B to detect information about the cells (i.e., the cells A and B) through the MS has passed (in step 522).

Thereafter, the BS 505 determines whether the MS has performed a handover to a plurality of cells within a predetermined time, to determine whether the MS has performed an unnecessary handover (in step 524). Herein, if determining that the MS has performed a handover to a plurality of cells within a predetermined time, the BS may determine that the MS has performed an unnecessary handover to at least one (e.g., the cell B) of the handover cells.

The BS 505 corresponding to the cell C, which has determined that the MS has performed an unnecessary handover (e.g., a handover to the cell B) as described above, transmits information, indicating the occurrence of an unnecessary handover to the cell B by the MS, to the BS 501 corresponding to the cell A that has performed a normal handover and to the BS 503 corresponding to the cell B (in step 526).

Accordingly, upon receiving the information indicating the occurrence of the unnecessary handover, the BS 501 and the BS 503 correct handover parameters to prevent the unnecessary handover from being performed again. That is, when the MS moves from the cell A to the cell C, the BS 501 and the BS 503 reduce their cell regions to make the cell C become the best candidate cell, so that the MS can perform a handover from the cell A to the cell C directly without performing a handover to the cell B. In another embodiment, the BS notifies information, indicating the unnecessary handover region, to MSs included in its cell, so that the MSs correct their handover parameters in order not to perform an unnecessary handover.

As described above, when an MS performs a handover to a plurality of cells in a mobile communication system, the present invention prevents an unnecessary handover to at least one of the handover cells. To this end, when detecting from the cell history information of the MS that the MS has performed an unnecessary handover during a short time, the present invention corrects handover parameters to prevent the MS from performing the unnecessary handover again.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A Base Station (BS) apparatus for preventing an unnecessary handover, the apparatus comprising:
    a handover manager configured to receive handover information, including information about at least one cell through which a Mobile Station (MS) has passed, from a neighbor cell to determine whether the MS has performed an unnecessary handover, and notify the occurrence of an unnecessary handover by the MS to the neighbor cell if the handover manager determines that the MS has performed an unnecessary handover.

2. The BS apparatus of claim 1, wherein upon detecting the occurrence of the unnecessary handover, the handover manager is configured to cause the neighbor cell to correct handover parameters to prevent the MS from performing the unnecessary handover again.

3. The BS apparatus of claim 1, wherein the notification of the occurrence of the unnecessary handover is configured to cause the neighbor cell to correct a handover parameter of a BS of a target cell or at least one of parameters of MSs included in the target cell.

4. The BS apparatus of claim 1, wherein the unnecessary handover means that the MS moves to a plurality of cells within a short time.

5. The BS apparatus of claim 1, wherein the notification of the occurrence of the unnecessary handover is configured to cause the neighbor cell to correct the handover parameters to reduce the coverage of the cell.

6. The BS apparatus of claim 1, wherein if the MS is to perform a handover to a target cell, the handover manager provides information about the previous cell and information about the current cell to a BS of the target cell.

7. A method for a Base Station (BS) to prevent an unnecessary handover, the method comprising:
    receiving, by the BS, handover information, including information about at least one cell through which a Mobile Station (MS) has passed, from a neighbor cell to determine whether the MS has performed an unnecessary handover; and
    notifying the occurrence of an unnecessary handover by the MS to the neighbor cell if determining that the MS has performed an unnecessary handover.

8. The method of claim 7, wherein upon detecting the occurrence of the unnecessary handover, the neighbor cell corrects handover parameters to prevent the MS from performing the unnecessary handover again.

9. The method of claim 7, wherein upon detecting the occurrence of the unnecessary handover, the neighbor cell corrects a handover parameter of a BS of a target cell or at least one of parameters of MSs included in the target cell.

10. The method of claim 7, wherein the unnecessary handover means that the MS moves to a plurality of cells within a short time.

11. The method of claim 7, wherein correcting the handover parameters reduces the coverage of the cell.

12. The method of claim 7, wherein if the MS is to perform a handover to a target cell, the BS provides information about the previous cell and information about the current cell to a BS of the target cell.

13. The method of claim 7, wherein the BS determines the occurrence of the unnecessary handover by determining whether there have been measurement for Event A3, Event A4 and Event A5 in the previous cell with respect to the current cell.

14. The method of claim 7, wherein receiving the handover information to determine whether the MS has performed the unnecessary handover includes determining whether there have been measurement for Event A3, Event A4 and Event A5 in the previous cell with respect to the current cell.

15. A base station capable of preventing an unnecessary handover, the base station comprising:
    a controller configured to control an operation of the base station; and
    a handover manager configured to receive handover information, including information about at least one cell through which a Mobile Station (MS) has passed, from a neighbor cell to determine whether the MS has performed an unnecessary handover, and notify the occurrence of an unnecessary handover by the MS to the neighbor cell the handover manager determines that the MS has performed an unnecessary handover.

16. The base station of claim 15, wherein upon detecting the occurrence of the unnecessary handover, the handover manager is configured to cause the neighbor cell to correct handover parameters to prevent the MS from performing the unnecessary handover again.

17. The base station of claim 15, wherein the notification of the occurrence of the unnecessary handover is configured to cause the neighbor cell to correct a handover parameter of a BS of a target cell or at least one of parameters of MSs included in the target cell.

18. The base station of claim 15, wherein the unnecessary handover means that the MS moves to a plurality of cells within a short time.

19. The base station of claim 15, wherein the notification of the occurrence of the unnecessary handover is configured to cause the neighbor cell to correct the handover parameters to reduce the coverage of the cell.

20. The base station of claim 15, wherein if the MS is to perform a handover to a target cell, the handover manager provides information about the previous cell and information about the current cell to a BS of the target cell.

* * * * *